March 10, 1942.   G. M. B. LANE ET AL   2,275,777
HEAVIER-THAN-AIR CRAFT
Filed May 8, 1939   3 Sheets-Sheet 1
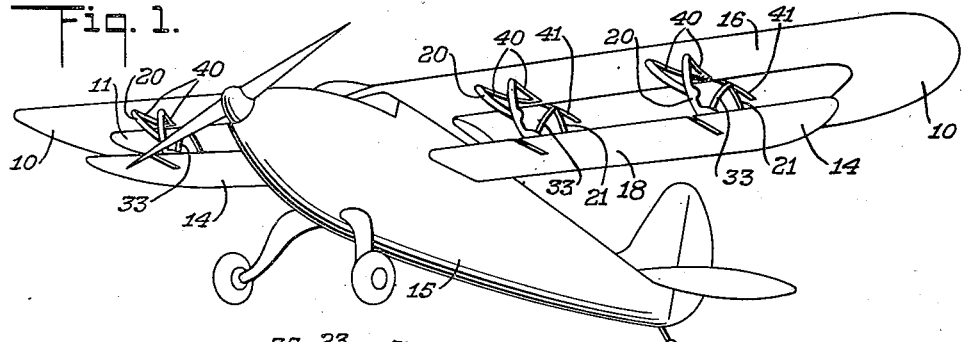
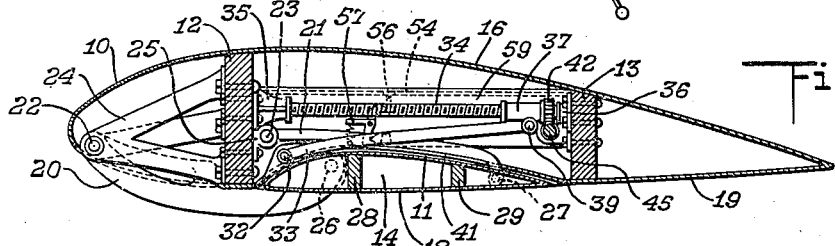
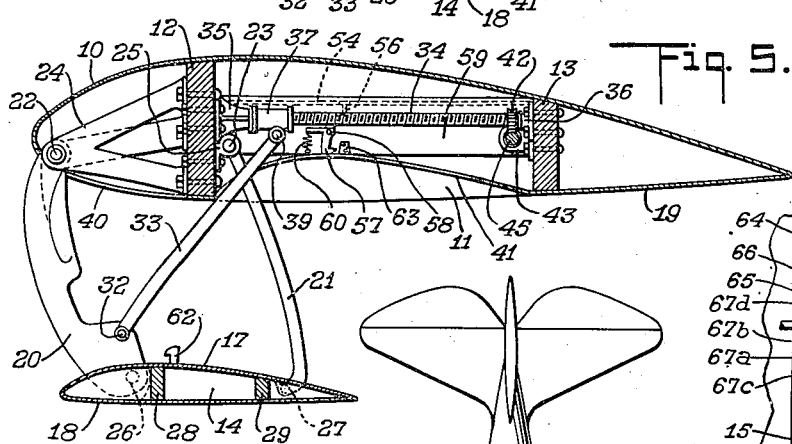
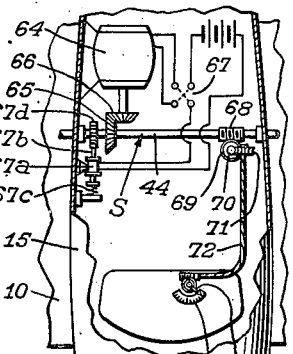
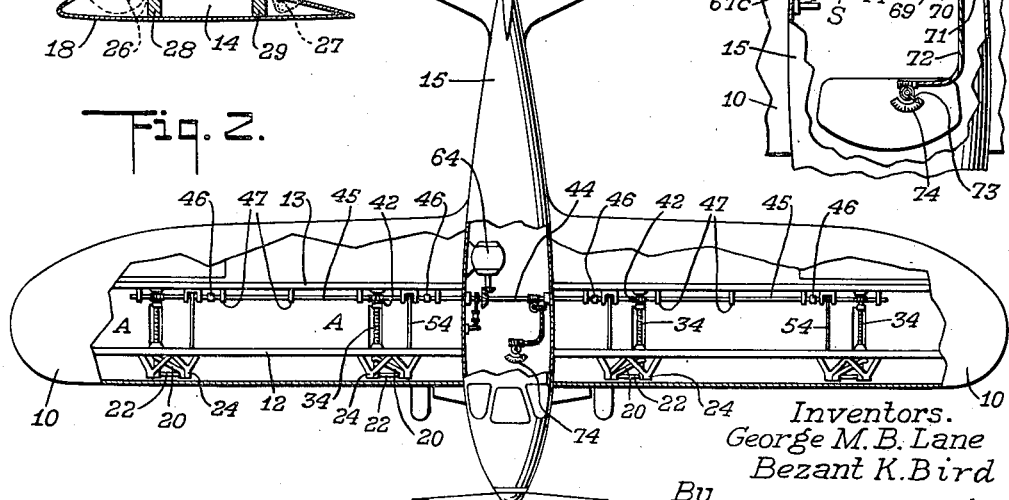
Inventors.
George M. B. Lane
Bezant K. Bird
By
Attorneys.

March 10, 1942. G. M. B. LANE ET AL 2,275,777
HEAVIER-THAN-AIR CRAFT
Filed May 8, 1939   3 Sheets-Sheet 2
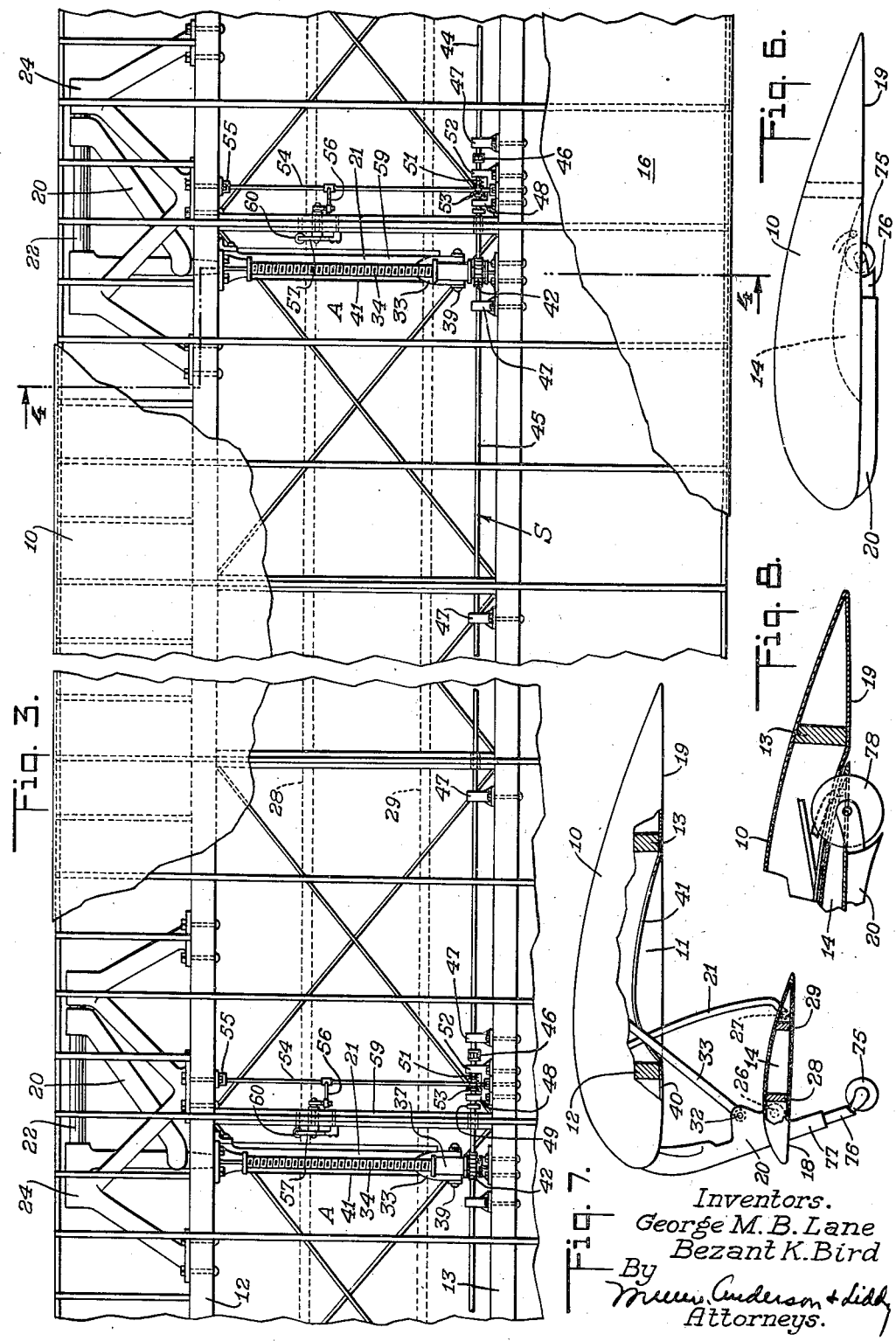
Inventors.
George M. B. Lane
Bezant K. Bird
By
Attorneys.

March 10, 1942.   G. M. B. LANE ET AL   2,275,777
HEAVIER-THAN-AIR CRAFT
Filed May 8, 1939   3 Sheets-Sheet 3
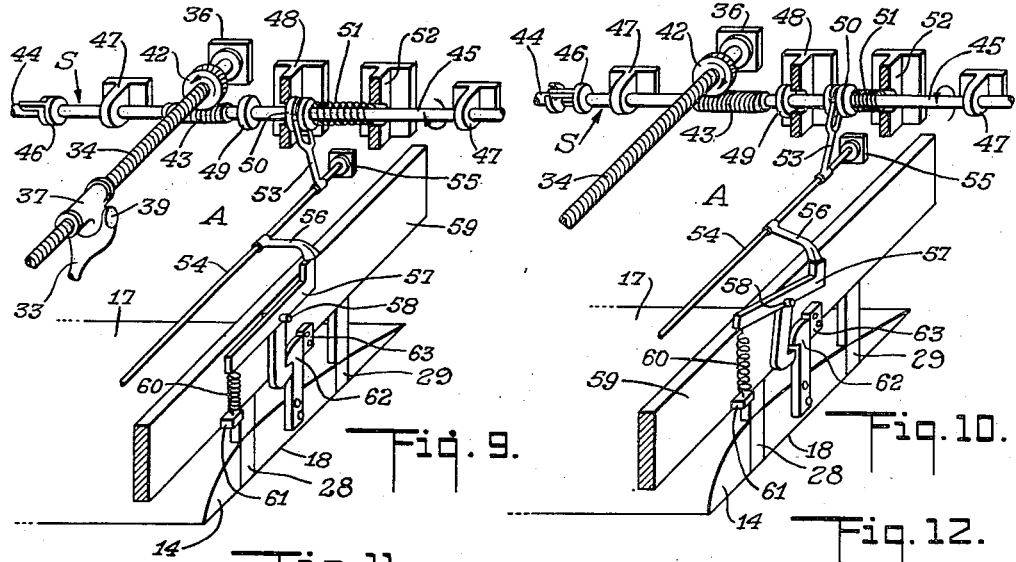
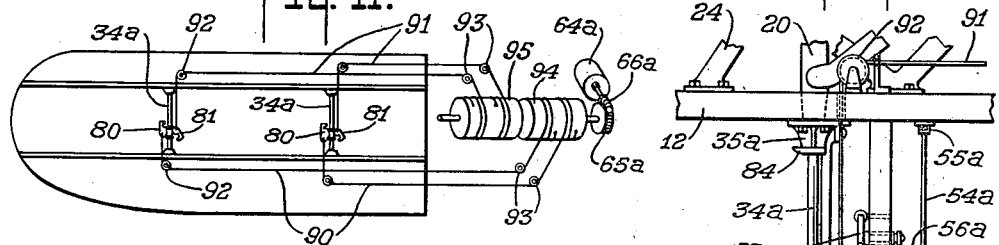
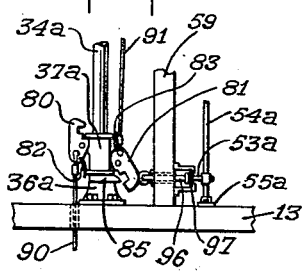
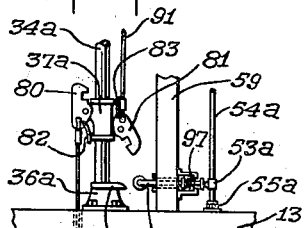
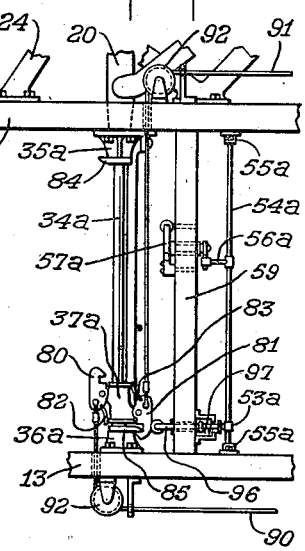
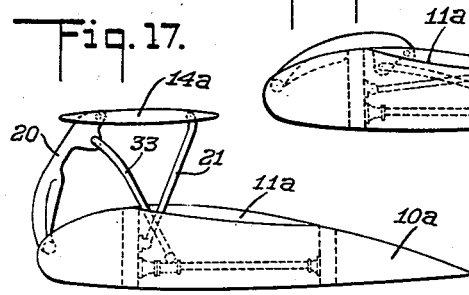
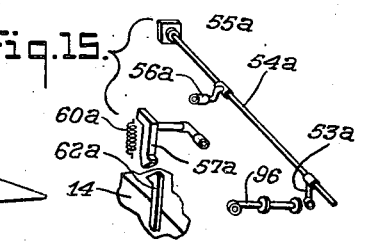
Inventors.
George M. B. Lane
Bezant K. Bird
By
Anderson & Liddy
Attorneys.

Patented Mar. 10, 1942

2,275,777

UNITED STATES PATENT OFFICE 2,275,777

HEAVIER-THAN-AIR CRAFT

George M. B. Lane, Los Angeles, and Bezant K. Bird, Inglewood, Calif.

Application May 8, 1939, Serial No. 272,320

4 Claims. (Cl. 244—43)

This invention relates generally to heavier-than-air craft, and more particularly to wing structures thereof by which variable lift and/or increased aerodynamic resistance to forward motion are obtained.

In modern heavier-than-air craft as at present constructed, the maximum horizontal speed rarely exceeds three times the landing or take-off speed. To increase the maximum speed, or to increase the useful load capable of being carried by the craft, it is generally necessary to increase the take-off speed. However, as the landing speed is nearly equal to the take-off speed, and as a pilot may desire, or be forced to land under conditions which are not ideal, various devices used only at landing speeds and intended to increase either the lift and/or aerodynamic resistance to forward motion have come into use.

In practice, such devices add little or no lift to an aircraft, although they do add varying amounts of flight resistance, their effect being to reduce the forward speed of the craft while adding materially to its vertical sinking speed. Therefore, unless care is exercised by the pilot, a hard landing at a speed only slightly below the normal high landing speed of the craft results. The effect of such devices when used in taking off is to increase the take-off run, and then to reduce the rate of climb once the craft has left the ground. It is considered by many pilots that these devices are dangerous when used with the engine of the craft out of action.

Other types of auxiliary-lift devices add lift to the aircraft only when flying at speeds considerably in excess of the landing speed. The action of these devices at landing speeds suddenly changes to one similar to the action of the devices first described.

Still other devices of the prior art, which have some measure of success in increasing lift and resistance include those which extend a portion of the underside of a wing's trailing edge rearwardly and downwardly, so as to have the effect of increasing the chord and camber of the wing, whereby to increase vertical sinking speed and without loss of lift so that there is less chance of a hard landing. However, these devices introduce a difficulty when landing, as the center of lift of the craft is moved rearwardly a sufficient amount to cause the craft to become strongly nose heavy, so that the extent to which they can be used is very limited.

It is clearly indicated by modern aerodynamic practice that when the effect of propeller thrust and horizontal tail area are removed, the craft should fly at or near landing speeds either a little nose heavy with the center of lift slightly behind the center of gravity, or from a little less nose heavy to a balanced state, with the center of lift at the center of gravity. An aircraft equipped with an auxiliary-lift device such as those types of prior art devices last described above, and being normal in extent, flies a little nose heavy at or near landing speeds, when the device is in use and the effects of propeller thrust and horizontal tail area are removed, with the attendant serious disadvantage of flying strongly tail-heavy under the same conditions, when the device is not in use.

The primary object of the present invention is to provide a heavier-than-air craft, the wing structure of which is characterized by means enabling the aerodynamic lift and resistance to forward motion of the craft to be materially increased so as to reduce landing and take-off speeds to a sufficient extent for the control of the craft during these operations to be simplified and greatly facilitated, all in a manner to avoid the defects and structural and functional disadvantages of the prior art devices as pointed out above.

Another object of this invention is to provide a heavier-than-air craft embodying an auxiliary lift device which, when inactive on the craft from which the effects of propeller thrust and horizontal tail area are removed, enables the craft to fly at or near landing speed slightly nose heavy, and which in its active position under the same flight conditions, will enable the craft to fly from a little less nose heavy to a balanced state, all in a manner to permit such small shift in the center of lift to be conveniently pilot-controlled by varying the active position of the devices as desired, whereby to greatly increase the safety in maneuvering the craft.

A further object of the invention is to provide an auxiliary lift device for heavier-than-air craft which will not introduce any appreciable added aerodynamic resistance in its inactive state, which will reduce the take-off speed and take-off run so that the angle of climb near the ground will be substantially the same with respect to the horizontal as the angle of climb with the device not in use, but with the craft traveling at a lower speed, all in such manner that in the inactive position of the device following the take-off, the craft could attain its best rate of climb at increased horizontal and vertical velocities.

A still further object of the invention is to provide an auxiliary lift device which is structurally characterized to enable it to be incorporated in a wing without detracting from the strength and aerodynamic efficiency thereof; which will be positively locked in inactive position so as to prevent fluttering of the device in all attitudes of flight such as the extreme attitudes of inverted flight and terminal velocity dive.

With these and other objects in view, the invention resides in the combinations, arrangements and functional relationships of elements as set forth in the following specification and particularly pointed out in the appended claims.

In the accompanying drawings,

Figure 1 is a perspective view of a heavier-than-air craft with one form of auxiliary lift device embodying this invention applied thereto;

Figure 2 is a plan view of the aircraft with a portion of the cabin and top covering of the wing broken away;

Figure 2a is a fragmentary plan sectional view showing driving and indicating mechanisms embodied in the invention;

Figure 3 is an enlarged fragmentary plan view of a wing of the aircraft with the top covering or skin broken away;

Figure 4 is a transverse sectional view taken on the line 4—4 of Figure 3 and illustrating the auxiliary lift device in its inactive or retracted position;

Figure 5 is a view similar to Figure 4, with the auxiliary lift device in its extreme active or projected position;

Figure 6 is a view similar to Figure 4 and illustrating a wing tip supporting wheel adapted to be embodied in the auxiliary lift device;

Figure 7 is a view similar to Figure 5, and also ilustrating the wing tip supporting wheel;

Figure 8 is a fragmentary transverse sectional view of a portion of a wing adjacent the cabin, and illustrating a landing wheel adapted to be embodied in the auxiliary lift device;

Figure 9 is a fragmentary, diagrammatic perspective view showing a latching mechanism for a wing of the auxiliary lift device, in its latching position;

Figure 10 is a view similar to Figure 9, with the latching mechanism in non-latching position;

Figure 11 is a diagrammatic plan view illustrating a modified form of actuating mechanism for a wing of the auxiliary lift device;

Figure 12 is a fragmentary plan view of the actuating mechanism shown in Figure 11;

Figures 13 and 14 are fragmentary views illustrating different positions of the actuating mechanism shown in Figure 12;

Figure 15 is a perspective view of separated parts of the actuating mechanism of Figure 12;

Figure 16 is a view in end elevation of the aircraft wing with the auxiliary lift device associated with the upper surface of the wing, and in its inactive position;

Figure 17 is a view similar to Figure 16 with the auxiliary device thereof in its active position.

Referring specifically to the drawings and particularly to Figures 1 to 5, inclusive, and 9 and 10, the invention is shown applied to a high wing monoplane of the single motored type. However, it will be understood that the invention is equally applicable to various types of heavier/than-air craft.

In carrying the invention into practice on a high wing monoplane, the wings 10 thereof are provided with shallow recesses 11 in the bottom surface of the wings preferably between their front and rear spars 12 and 13. These recesses are adapted to receive auxiliary wings 14, and, in the high wing monoplane, terminate adjacent the cabin 15 and in spaced relation to the tips of the main wings 10. However, in a low wing monoplane, these recesses can be connected across the belly of the cabin to receive a single auxiliary wing.

The auxiliary wings 14 are mounted from the main wings 10 for movement from the inactive or retracted position shown in Figure 4, to active or projected positions, the most extreme one of which is shown in Figures 1 and 5. In its retracted position, the wings 14 completely and snugly fill the recesses 11, by coaction with the cover or skin 16 of the main wings 17 of the auxiliary wings. As clearly shown in Figure 4, the bottom surface 18 of the auxiliary wings forms a smooth continuation of the bottom surface 19 of the main wings beyond the recesses 11 so as not to detract from the aerodynamic efficiency of the main wings in the retracted position of the auxiliary wings. Furthermore, the fact that the bottom surface of the main wings is responsible for only approximately twenty to thirty percent of the total lift of he wings, and that the recesses 11 are relatively shallow and streamlined, does not appreciably affect the aerodynamic efficiency of the main wings in active positions of the auxiliary wings.

The movement of each auxiliary wing 14 is generally by translation, and for this purpose a general parallelogrammic arrangement of links is provided and is composed of a pair of Y-links 20 and links 21, respectively, pivoted at 22 and 23 on brackets 24 and 25 secured to the front spar 12 of the main wing. At their other ends the links 20 and 21 are, respectively, pivoted at 26 and 27 to the front and rear spars 28 and 29 of the auxiliary wing.

Pivotally connected at 32 to the links 20 of each auxiliary wing are actuating links 33 forming part of actuating and latching mechanisms A, of which there are four in the present instance, as shown in Figure 2, although it will be understood that any number of link connections and actuating mechanisms can be provided in accordance with structural requirements and the span of the auxiliary wings.

Each actuating and latching mechanism which includes one of the links 33 is composed of a shaft 34 journaled at its ends in bearings 35 and 36 secured to the front and rear spars 12 and 13 of the main wing. In this form of the invention, the shaft 34 is screw threaded so as to constitute a feed member for a sleeve internally threaded to form a nut 37 which is fed axially on the shaft 34 in response to rotation of the latter. The other end of the link 33 is pivotally connected at 39 to the nut 37 so as to project or retract the auxiliary wing by a substantially translating motion according as the nut 37 is fed in one direction or the other. From a consideration of Figure 1, it will be noted that the bottom covers of the main wings are provided with Y-slots 40 and with straight slots 41, the former to receive the links 20, and the slots 41 to receive the links 21 and 33. In the retracted position of the auxiliary wings, only portions of the links 20 project from the main wings, and, as such links are streamlined, loss of aerodynamic efficiency is negligible.

Fixed to each shaft 34 is a worm wheel 42 with which constantly meshes a worm 43. Common to all of the actuating mechanisms is a drive shaft S composed of a central driving section 44 and end driven sections 45, one for each main wing 10, and operatively connected to the central driving section by splined connections 46, the several sections being journaled coaxially in suitable bearings 47 on the rear spars 13 of the main wings, as shown in Figure 2.

The worms 43 of the two actuating mechanisms for each auxiliary wing 14 are secured to the respective driven section 45 of the shaft S. As clearly shown in Figures 9 and 10, each driven section 45 is confined to a limited axial movement by a fixed stop 48 on the rear spar 13 adapted to be engaged by either one of two spaced collars 49 and 50 fixed to the driven section. A relatively strong compression coil spring 51 on the driven section abuts a second fixed stop 52 on the rear spar 13, and the collar 50, for co-action therewithin normally urging the driven section to one extreme position of its axial movement wherein the collar 50 engages the stop 48 as shown in Figure 9.

The collar 50 is provided with an annular groove receiving the yoke of an arm 53 fixed to a rock shaft 54 mounted in suitable bearings 55 on the front and rear spars 12 and 13 and having also fixed thereto a second arm 56 engaging one arm of a T-shaped latch 57 pivoted at 58 on a compression spar or rib 59 of the main wing 10. A spring 60, connected to the latch 57 and to a lug 61 on the spar 59, normally urges the latch to the latching position shown in Figure 9, for latching engagement of the bill of the latch with the hooked head of a keeper 62 on the auxiliary wing 14 when the latter occupies its inactive or retracted position in the recess 11 of the main wing 10 as shown in Figures 4 and 9. In this position of the auxiliary wing the rear face of the keeper 62 abuts a stop 63 on the spar 59 to prevent disengagement of the keeper from the latch 57 when occupying its latching position.

The central section 44 of the drive shaft S can be rotated manually, though preferably by power, such as a reversible electric motor 64 supported in the cabin 15 and operatively connected to the section 44 by a pair of bevel gears 65 and 66. Electric current available on the aircraft is utilized to operate the motor 64, and a suitable reversing switch 67 convenient to the pilot is provided to control the motor circuit. A solenoid 67a has its winding series connected in the motor circuit, so that the latter, when closed, will supply current to the winding to retract the core 67b of the solenoid against the action of a spring 67c, and will hold the core in an unlocking position with respect to the teeth of a locking wheel 67d fixed to the shaft section 44, whereby to free the latter for rotation by the motor. However, when the supply of current to the motor is discontinued, the spring 67c moves the core 67b to its locking position for co-action with the locking wheel in locking the shaft S against rotation under any vibration set up in the aircraft during flight. Any suitable overload or circuit-breaker type of switch can be used in the motor circuit to discontinue the supply of current to the motor when the auxiliary wings 14 reach either of their extreme positions.

The operation of the invention is as follows: Let it be assumed that the auxiliary wings 14 are latched in retracted position for high speed flight as shown in Figure 4, and that a landing is to be made. Upon supplying current to the motor 64, initial rotational movement of the driving shaft S causes the worms 43 to have a screwing movement with respect to the teeth of the respective worm wheels 42, thus axially shifting the shaft sections 45 against the springs 51 until the collars 49 simultaneously abut the stops 48 as shown for example in Figure 10. During this lost motion of the drive shaft S with respect to the feed shafts 34, the worm wheels 42 merely function as nuts so that no movement is imparted to the feed shafts 34.

Through the medium of the arms 53 and the collars 50, the shafts 54 are rocked to cause the arms 56 to move the latches 57 to their non-latching position against the action of the springs 60, as shown in Figure 10, thus releasing the keepers 62.

Upon engagement of the collars 49 with the respective stops 48, positive operative connections are established between the worms 43 and worm wheels 42, so that the latter will be driven to rotate the several feed shafts 34, and thus initiate movement of the auxiliary wings 14 in absolute synchronism and parallelism from their fully retracted position, by simultaneously feeding the nuts 37 on the shafts 34 and corresponding movements transmitted to the links 20 and 21 by the actuating links 33.

Due to the irreversible connection between the shafts 34 and nuts 37, the auxiliary wings 14 are automatically locked in any active position of adjustment, so that by discontinuing operation of the motor 64 at any point in the movement of the auxiliary wings the latter will be rigidly maintained in the selected position of adjustment.

It is to be noted that when power is removed from the drive shaft S during projecting movement of the auxiliary wings 14 at any intermediate position, the springs 51 are free to expand and reversely shift the shaft sections 45 until the collars 50 abut the respective stops. This reverse axial shifting of the shaft sections 45 is made possible by the functioning of the worms 43 as racks imparting slight reverse rotational movement to the worm wheels 42 which movement is negligible insofar as feeding of the nuts 37 and changing the positions of adjustment of the auxiliary wings is concerned.

To retract the auxiliary wings, operation of the motor 64 is reversed. As the collars 50 are abutting the respective stops 48 under the action of the springs 51, positive reverse rotation of the feed shafts 34 will be effected to reversely feed the nuts 37 and cause retracting movement of the auxiliary wings.

It will be noted that when the shaft sections 45 are not being rotated under power, the strong springs 51 act to maintain the collars 50 against the respective stops 48, and also act as locks to prevent the shaft 34 from rotating at any position of adjustment.

The springs 51 also function to prevent the arms 56 from accidentally opening the latches 57 when the aircraft is flying in various extreme attitudes such as inverted flight, terminal velocity dive and other maneuvers.

As the relative lengths of the links 20 and 21 determine the relative aerodynamic angles of attack of the wings 14 in their various positions of adjustment, such mechanical arrangement is utilized to a decided advantage. For example, it is desirable that the auxiliary wings be disposed at a lesser angle of attack for take-off than for landing. It is calculated that in practice, when the auxiliary wings are approximately two-thirds projected, the center of lift of the aircraft should remain substantially the same as with the auxiliary wings in inactive position, which is suitable for a take-off.

When fully projected, the auxiliary wings are disposed at a maximum angle of attack and the center of lift has moved forwardly a short distance, which is considered a desirable condition for a landing.

By changing the relative lengths of the links 20 and 21, the forward displacement of the center of lift of the aircraft can be increased. Should this be done, the nose heavy effect of trailing edge flaps could be neutralized if such flaps were used in conjunction with the auxiliary wings, and their relationships of movements be so synchronized that there would be no appreciable change in the center of lift irrespective of the positions of adjustment of the auxiliary wings and flaps.

In order to indicate all positions of adjustment of the auxiliary wings to the pilot, a worm 68 is fixed to the central section 44 of the shaft S and drives a worm wheel 69, which latter, in turn, drives a second worm 70 constantly meshing with a second worm wheel 71 driving a flexible shaft 72. The flexible shaft operates the pointer 73 of a suitable indicator 74 on the instrument board of the aircraft.

Reference will now be had to Figures 6 and 7, which illustrate the use of wing tip supporting wheels 75 rotatably carried by suitable shock absorbing mountings 76 on extensions 77 of those links 20 nearest the tip ends of the auxiliary wings 14. In the retracted position of the auxiliary wings shown in Figure 6, the wheels 75 are partially housed by the wings, and do not appreciably affect the efficiency of the main wings 10, whereas in the fully projected position of the auxiliary wings shown in Figure 7, the wheels 75 effectively protect the tips of the wings from contact with the ground should a lateral tilting of the craft occur during take-off or landing.

In Figure 8 there is illustrated a landing wheel 78 which can be rotatably carried by a suitable shock absorbing mounting on each of those links 20 closest to the cabin of the craft, so as to displace the present landing wheels, yet function in the same manner.

Figures 11 to 15, inclusive, illustrate a modified form of actuating and latching mechanism for the auxiliary wings 14. These mechanisms are located in the main wings 10 in the same manner as the form of mechanism previously described, and each comprises a fixed shaft 34a secured in brackets 35a and 36a on the front and rear spars 12 and 13 of the main wing. A sleeve 37a is slidably mounted on the shaft 34a and has pivotally connected thereto the actuating link 33.

Pivoted on the sleeve 37a are latches 80 and 81 normally urged by springs 82 and 83 to a latching position for alternate latching co-action with the respective keepers 84 and 85 on the brackets 35a and 36a, according as the auxiliary wing 14 occupies fully retracted or fully projected position, as is effected when the sleeve 37a occupies one extreme position or the other on the shaft 34a.

Cables 90 and 91 are trained over suitable pulleys 92 and 93 in the main wing and cabin, and at one end are reversely trained over coaxially mounted drums 94 and 95 adapted to be driven in one direction or the other by a reversible motor 94a through suitable gearing 95a—98a.

The other ends of the cables 90 and 91 are, respectively, connected to the latches 80 and 81 at such locations that a pulling force exerted on one cable or the other will first move the respective latch 80 or 81 to non-latching position with respect to the keeper 84 or 85, as the case may be, so as to free the sleeve 37a for movement on the shaft 34a to effect actuation of the auxiliary wing.

A latching mechanism similar to that previously described in conjunction with the first form of the invention is employed to latch the auxiliary wing in fully retracted position and includes a rock shaft 54a mounted in bearings 55a on the front and rear spars 12 and 13, and has fixed thereto an arm 53a engaged by a spring pressed plunger 96 actuatable against its spring 97 by the latch 81 when moved to non-latching position prior to initiating projecting movement of the auxiliary wing.

The rock shaft 54a has fixed thereto a second arm 56a engaging the latch 57a pivoted at 58a on the compression spar or rib 59 of the main wing 10. A spring 60a (Figure 15) normally urges the latch 57a to its latching position with respect to a keeper 62a on the auxiliary wing.

Actuation of the plunger 96 by the latch 81 from the position shown in Figure 12 to that shown in Figure 13 rocks the shaft 54a sufficiently to move the latch 57a to non-latching position, whereby to release the auxiliary wing for projecting movement as the sleeve 37a is pulled by the cable 91 from the extreme position shown in Figure 13, as indicated by the progress of the sleeve on the shaft 34a in Figure 14.

It will be clear that upon unitary rotation of the drums 95 and 94 in one direction or the other the latch 81 and the latch 57a, or the latch 80, will first be released, according as the auxiliary wing 14 is occupying fully retracted or projected position, following which the wing will be actuated.

If desired, an indicating device, similar to that previously described, can be driven from the drum unit 94—95 to indicate to the pilot the position occupied by the auxiliary wing.

By references to Figures 16 and 17, it will be seen that the auxiliary wings 14a can be mounted from the main wings 10a for movement from a shallow recess 11a in the top cambered surface of the main wings, to active positions above the latter, with functional advantages similar to those previously described. However, as the top cambered surface creates the major portion of the lift, a greater aerodynamic loss results from interrupting this surface by the recess 11a, and thus reduces the efficiency of the main wings to some extent.

What is claimed is:

1. In an aircraft, a main wing having a recess in a lifting surface thereof; an auxiliary wing; pairs of links pivotally connected to the main and auxiliary wings to mount the latter for movement from an inactive position in said recess, to an active position spaced from the main wing at a predetermined angle of attack; actuating links connected to the auxiliary wing; feed members mounted for reciprocating movement and operatively connected to the actuating links for movement of the auxiliary wing thereby as aforestated; means for reciprocating the feed members; latches co-acting with the auxiliary wing to releasably retain the latter in inactive position; and means co-acting with said last means and said latches to release the latter from the auxiliary wing automatically in response to the initiating of an adjustment of the auxiliary wing from inactive position.

2. In an aircraft, a main wing having a recess in a lifting surface thereof; an auxiliary wing; pairs of links pivotally connected to the main and auxiliary wings to mount the latter for movement from an inactive position in said recess, to an active position spaced from the main wing at a predetermined angle of attack; actuating links connected to the auxiliary wing; rotatably mounted feed shafts; nuts threaded on the shafts for feeding axially thereon in response to rotation of the shafts; a drive shaft; means operatively connecting the drive shaft to the feed shafts for rotation of the latter thereby; latches co-acting with the auxiliary wing to releasably retain the latter in inactive position; and means co-acting with the drive shaft and latches to release the latter from the auxiliary wing in response to initial actuation of the drive shaft in adjusting the auxiliary wing from its inactive position.

3. In an aircraft, a main wing having a recess in a lifting surface thereof; an auxiliary wing; pairs of links pivotally connected to the main and auxiliary wings to mount the latter for movement from an inactive position in said recess to an active position spaced from the main wing at a predetermined angle of attack; actuating links connected to the auxiliary wing; rotatably mounted feed shafts; nuts threaded on the shafts for feeding axially thereon in response to rotation of the shafts; a drive shaft having a rotatably driven and axially shiftable section; means operatively connecting said feed member and shaft section, by which initial rotation of the latter to adjust the auxiliary wing from inactive position will effect axial shifting of the shaft section; latches co-acting with the auxiliary wing to releasably retain the latter in inactive position; means responsive to said axial shifting of the shaft section to release the latches from the auxiliary wing for movement by said operative connecting means to active position following such release of the latches; and means for rotating the drive shaft.

4. In an aircraft, a main wing having a recess in a lifting surface thereof; an auxiliary wing; pairs of links pivotally connected to the main and auxiliary wings to mount the latter for movement from an inactive position in said recess, to an active position spaced from the main wing at a predetermined angle of attack; actuating links connected to the auxiliary wing; feed members mounted for reciprocating movement and operatively connected to the actuating links for movement of the auxiliary wing thereby as aforestated; rotatably mounted drums; cables trained about said drums; latches carried by said feed members; fixed keepers with respect to which one latch or another is adapted to be latched according as the feed member occupies one extreme position or the other; means connecting said cables to the respective latches to release one or the other from its respective keeper according as a pulling force is exerted upon one cable or the other in response to rotation of the drums so as to free the feed member for movement by further pulling upon the cable; and means for driving the drums.

GEORGE M. B. LANE.
BEZANT K. BIRD.